United States Patent [19]

Sharangpani et al.

[11] Patent Number: 5,699,537
[45] Date of Patent: Dec. 16, 1997

[54] PROCESSOR MICROARCHITECTURE FOR EFFICIENT DYNAMIC SCHEDULING AND EXECUTION OF CHAINS OF DEPENDENT INSTRUCTIONS

[75] Inventors: Harshvardhan P. Sharangpani, Santa Clara; Kent G. Fielden, Sunnyvale; Hans J. Mulder, San Francisco, all of Calif.

[73] Assignee: Intel Corporation, Santa Clara, Calif.

[21] Appl. No.: 577,865

[22] Filed: Dec. 22, 1995

[51] Int. Cl.⁶ .................................................. G06F 9/38
[52] U.S. Cl. .......................... 395/393; 395/394; 395/800
[58] Field of Search ................................ 395/383, 391, 395/393, 394, 800

[56] References Cited

U.S. PATENT DOCUMENTS

| | | | |
|---|---|---|---|
| 5,471,593 | 11/1995 | Branigin | 395/24 |
| 5,546,593 | 8/1996 | Kimura et al. | 395/800 |
| 5,553,256 | 9/1996 | Fetterman et al. | 395/800 |
| 5,559,976 | 9/1996 | Song | 395/391 |
| 5,592,679 | 1/1997 | Yung | 395/800 |
| 5,604,753 | 2/1997 | Bauer et al. | 371/40.1 |
| 5,615,350 | 3/1997 | Hesson et al. | 395/394 |

OTHER PUBLICATIONS

Harry Dwyer III, A Multiple, Out-of-Order, Instruction Issuing System for Superscalar Processors, Phd. Dissertation, Cornell University, Aug. 1991, pp. 16–19.

"The Metaflow Architecture," pp. 10–13 and 63–73, by Val Popescu, Merle Schultz, John Spracklen, Gray Gibson, Bruce Lightner, and David Isaman, IEEE Micro, 1991.

Johnson, Mike, "Superscalar Microprocessor Design", Prentice Hall, 1991.

Primary Examiner—William M. Treat
Attorney, Agent, or Firm—Blakely, Sokoloff, Taylor & Zafman

[57] ABSTRACT

A processor microarchitecture for efficient dynamic instruction scheduling and execution. The invention includes a predetermined number of independent dispatch queues. The invention also includes a cluster of execution units coupled to each dispatch queue such that the dispatch queue and the corresponding cluster of execution units forms an independent micropipeline. Chain-building and steering logic coupled to the dispatch queues identifies a consumer instruction relying on a producer instruction for an operand, and issues the consumer instruction to the same dispatch queue as the producer instruction that it is dependent upon. The instructions are issued from the dispatch queue to the corresponding cluster of execution units. In one embodiment, the output of each execution unit in the cluster is routed to the inputs of all execution units in the cluster such that the result of executing the producer instruction is readily available as an operand for execution of the consumer instruction.

22 Claims, 7 Drawing Sheets

PROCESSOR MICROARCHITECTURE FOR EFFICIENT DYNAMIC SCHEDULING AND EXECUTION OF CHAINS OF DEPENDENT INSTRUCTIONS

FIELD OF THE INVENTION

The invention relates to the field of computer systems. Specifically, the invention relates to a processor microarchitecture providing for efficient dynamic scheduling and execution of chains of dependent instructions.

BACKGROUND OF THE INVENTION

Microprocessor designers and manufacturers continue to focus on improving microprocessor performance to execute increasingly complex software which delivers increasing utility. While manufacturing process improvements can help to increase the speed of a microprocessor by reducing silicon geometries, the design of the processor, particularly the instruction execution core, is critical to processor performance.

Many microprocessors use instruction pipelining to increase instruction throughput. An instruction pipeline processes several instructions through different phases of instruction execution concurrently, using an assembly line-type approach. Individual functional blocks, such as a decode block for example, may be further pipelined into several stages of hardware, with each stage performing a step in the instruction decode process on a separate instruction. Thus, processor hardware pipelines can be very deep with many distinct pipeline stages.

Another approach to improving instruction execution speed is referred to as "out-of-order" execution. Out-of-order execution provides for the execution of instructions in an order different from the order in which the instructions are issued by the compiler in an effort to reduce the overall execution latency of the program including the instructions. One approach to out-of-order instruction execution uses a technique referred to as "register scoreboarding" in which instructions are issued in-order, but executed out-of-order. Another form of out-of-order execution employs a technique known as "dynamic scheduling". In a machine providing for dynamic scheduling, even the issue of instructions to execution hardware is rescheduled to be different from the original program order. In both of the above cases, results of instruction execution may be available out-of-order, but the instructions are retired in program order. Instruction pipelining and out-of-order techniques, including dynamic scheduling, may be used separately or together in the same microprocessor. A comparison of these instruction execution approaches is shown in Table 1.

TABLE 1

| Instruction Processing Step | Pipelined, In-Order Machine | Out-Of-Order Execution (May also be pipelined) | |
|---|---|---|---|
| | | Register Scoreboard | Dynamic Scheduling |
| Decode | in-order | in-order | in-order |
| Issue | in-order | in-order | out-of-order |
| Execute | in-order | out-of-order | out-of-order |
| Retire | in-order | in-order | in-order |

The impact of the above-mentioned design approaches on microprocessor performance may be reduced if the execution hardware pipeline is not effectively utilized when executing instructions. Advanced software tools, such as compilers with instruction scheduling, help to enhance microprocessor performance by directing software to use microprocessor resources more efficiently. For example, through instruction scheduling, the compiler "schedules" instructions to execute in a particular order based on a known execution time, or latency, for each instruction, to take advantage of particular microprocessor architecture features. The compiler instruction schedule is referred to as a "static" instruction schedule, as it is determined prior to run-time.

One problem, however, is that the latencies for particular instructions, referred to as "statically non-deterministic" instructions, cannot be determined at compile time. For example, the latency of a LOAD instruction varies from program to program, and depends upon several factors including the sizes of the memories in the particular computer system. Resolution of branch instructions is another cause of unknown latencies, as it is not known at compile time how the branch will be resolved, and therefore, which instructions will be fetched following the branch instruction. For this reason, a compiler instruction scheduler is limited in its capabilities to take optimal advantage of the hardware execution resources.

Computer system instructions are often in a format that specifies the type of operation to be performed, one or more source operands, also referred to as source identifiers, and a destination location for the result of the operation, also known as the destination identifier. Source identifiers and destination identifiers are usually pointers to register locations which contain the required data or indicate where the data will be stored.

The term "consumer" instruction is used herein to refer to an instruction that relies on the result of another instruction, referred to as a "producer" instruction, for one or both of its source operands. Also, a consumer instruction is referred to herein as having an unresolved data-dependency when the required operands for execution of the instruction are not yet available because the producer instruction has not been executed. In some systems, when a consumer instruction is identified and its operands are unavailable, the entire instruction execution pipeline stalls until the operands are available, sometimes for several clock cycles. Typically, the compiler attempts to schedule around these delays by utilizing knowledge of instruction latencies. However, non-deterministic latencies and LOAD misses can limit the success of the compiler and significant performance losses may be incurred.

Some microprocessors address this problem by providing for dynamic rescheduling of the static schedule produced by the compiler, as discussed above. One such approach uses register renaming and a "reservation station" in cooperation with content-addressable memory match (CAM-match) hardware to provide for dynamic rescheduling. An example of such a processor is shown in FIG. 1. The processor 101 includes an instruction execution front-end 102 and an instruction execution core 103. The instruction execution front-end 102 fetches and decodes instructions, and performs other pre-execution operations such as branch prediction.

The reservation station 104 is a buffer that holds instructions until the operands required by the instructions are available, and the appropriate functional unit is ready. Thus, if the instruction is a consumer instruction, the reservation station 104 will not dispatch the consumer instruction until the producer instruction(s) producing the required operand(s) has been executed. The reservation station 104 and the CAM-match hardware 114 are illustrated as part of the execution core 103, but they may alternately be part of the instruction execution front-end 102.

The processor 101 includes functional units 108–111 for executing different types of instructions. The reservation station 104 uses the CAM-match hardware 114 to compare the results from all of the functional units 108–111 on the destination wires 120–123 (also shown as destination buses 113) and in buffer 115 to all of the source operands of the instructions in the reservation station buffer 106. To perform this comparison and dispatch function, the reservation station 104 not only stores several instructions, but it also stores available operands. Thus, the reservation station 104 and the associated CAM-match hardware 114 are expensive in terms of integrated circuit space.

Further, the above-described approach places complex CAM-match hardware 114 in the critical path of the execution core 103. In most cases, it is desirable or necessary to issue one or more instructions every clock cycle. The delays introduced by the need to compare all of the destination bus identifiers to all of the source identifiers in the reservation station 104, place a limit on the cycle time of the computer system. In this manner, overall execution speed is reduced.

Additionally, this approach uses extensive interconnect wiring for "global bypasses". The global bypasses are shown in FIG. 1 as the wires 120–123 connecting the output of the functional units 108–111 to the CAM-match hardware 114 and the multiplexor 107. In addition to requiring the CAM-match hardware 114 to perform a large number of comparisons, the use of global bypasses as in FIG. 1 has another disadvantage: Interconnect speed scales more slowly than device speed with improvements in semiconductor process technology. In other words, a semiconductor process improvement that yields a 2× improvement in device speed may only lead to a 1.5× improvement in interconnect speed. Extensive or exclusive use of global bypasses as illustrated in FIG. 1, thereby prevents microprocessor performance from reaching its full potential by limiting the frequency of operation.

As will be shown, the invention provides for efficient overlapped and parallel execution of several independent chains of dependent instructions, without the requirement for complex and costly CAM-match hardware. The invention also reduces interconnect wiring in some embodiments, enabling microprocessor performance improvements to correspond more closely to improvements in semiconductor process technology.

SUMMARY OF THE INVENTION

A processor microarchitecture for efficient dynamic scheduling and execution of chains of dependent instructions is described. The invention includes a predetermined number of independent dispatch queues. The invention also includes a cluster of execution units coupled to each dispatch queue, such that a particular dispatch queue and the corresponding cluster of execution units forms an independent micropipeline. Chain-building and steering logic coupled to the dispatch queues identifies a consumer instruction which relies on a producer instruction for operands. The chain-building and steering logic of the invention issues the consumer instruction to the same dispatch queue as the producer instruction that it is dependent upon. Instructions are issued from each of the dispatch queues to the corresponding cluster of execution units, such that a result of executing the producer instruction is readily available as the operand for the consumer instruction. In this manner, several independent chains of dependent instructions are executed concurrently.

In one embodiment of the invention, the output of each execution unit in the cluster is routed to the inputs of all execution units in the cluster such that the result of executing an instruction is available to the inputs of the execution units in the cluster for use in executing a subsequent instruction.

Also, in one embodiment, a load/store dispatch queue provides for out-of-order dispatch of load instructions from the load/store dispatch queue, such that if a load or store instruction at the head of the dispatch queue cannot be dispatched, a subsequent load instruction may be dispatched.

DETAILED DESCRIPTION OF THE INVENTION

A processor microarchitecture for efficient dynamic scheduling and execution of independent chains of dependent instructions is described. In the following description, numerous specific details are set forth, such as specific functional blocks, numbers of dispatch queues and execution units, and instruction formats, in order to provide a thorough understanding of the invention. However, it will be appreciated by those skilled in the art that the invention may be practiced without these specific details. In other instances, well-known structures, circuit blocks, interfaces and architectural functions have not been described in detail in order to avoid obscuring the invention.

Overview of the Computer System of the Invention

Figure 2:
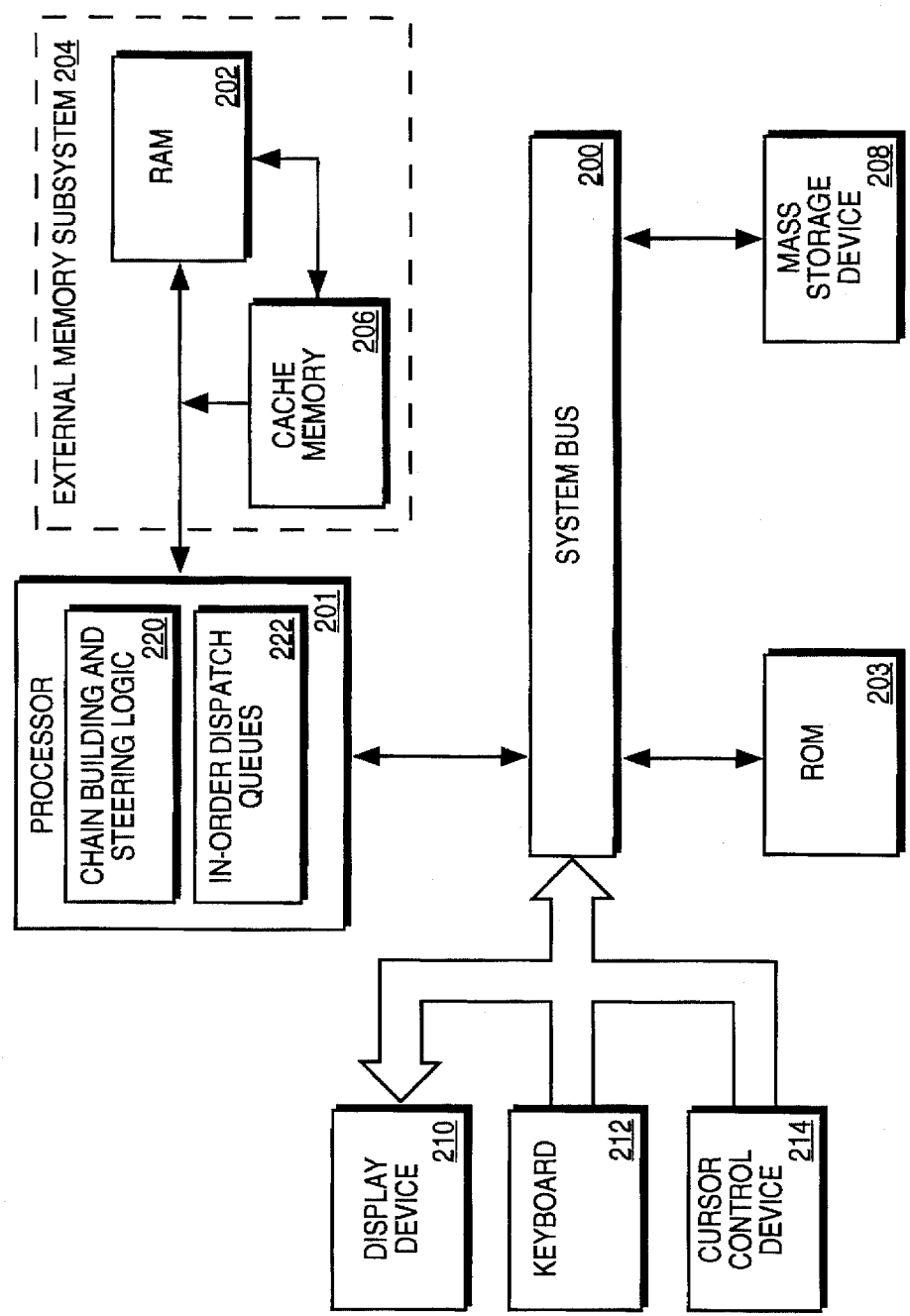
FIG. 2 is a high-level block diagram of one embodiment of the computer system of the invention.

FIG. 2 illustrates a computer system in accordance with one embodiment of the invention. The computer system of the invention includes a system bus 200 for communicating information, a processor 201 coupled to the bus 200 for processing information, a random access memory (RAM) 202, also referred to as system memory or main memory, coupled to the bus 200 for storing information and instructions for the processor 201, and a read only memory (ROM) 203, or other static storage device, coupled to the bus 200 for storing static information and instructions for the processor 201.

The processor 201 includes chain-building and steering logic 220, as well as in-order dispatch queues 222, to provide for efficient dynamic instruction scheduling and execution. The details of the chain-building and steering logic 220 and the in-order dispatch queues 222 are provided below in reference to FIG. 4.

The computer system of the invention also includes an external cache memory 206 for storing frequently and recently used information for the processor 201. The cache memory 206 may be configured within the same integrated circuit device package as the processor 201 or in a separate device package. Devices within the dotted lines defining the box 204 are referred to together as the external memory subsystem 204 which may also include additional devices not shown in FIG. 2. Other components such as a mass storage device 208, a display device 210 such as a printer or monitor, a keyboard 212 or other input device, and a cursor control device 214 may also be included in the computer system of the invention.

In one embodiment, the processor 201 is an Intel Architecture Microprocessor such as is manufactured by Intel Corporation of Santa Clara, Calif., the corporate assignee of the invention. Other processor architectures such as PowerPC, Alpha, etc., may also be used in accordance with the invention.

It will be appreciated by those skilled in the art that other computer systems may be used with the invention. Similarly, it will be appreciated by those skilled in the art that the computer system illustrated in FIG. 2 may include additional components not illustrated in FIG. 2 or may be configured without components that are illustrated in FIG. 2.

Processor Configuration of the Invention

Figure 3:
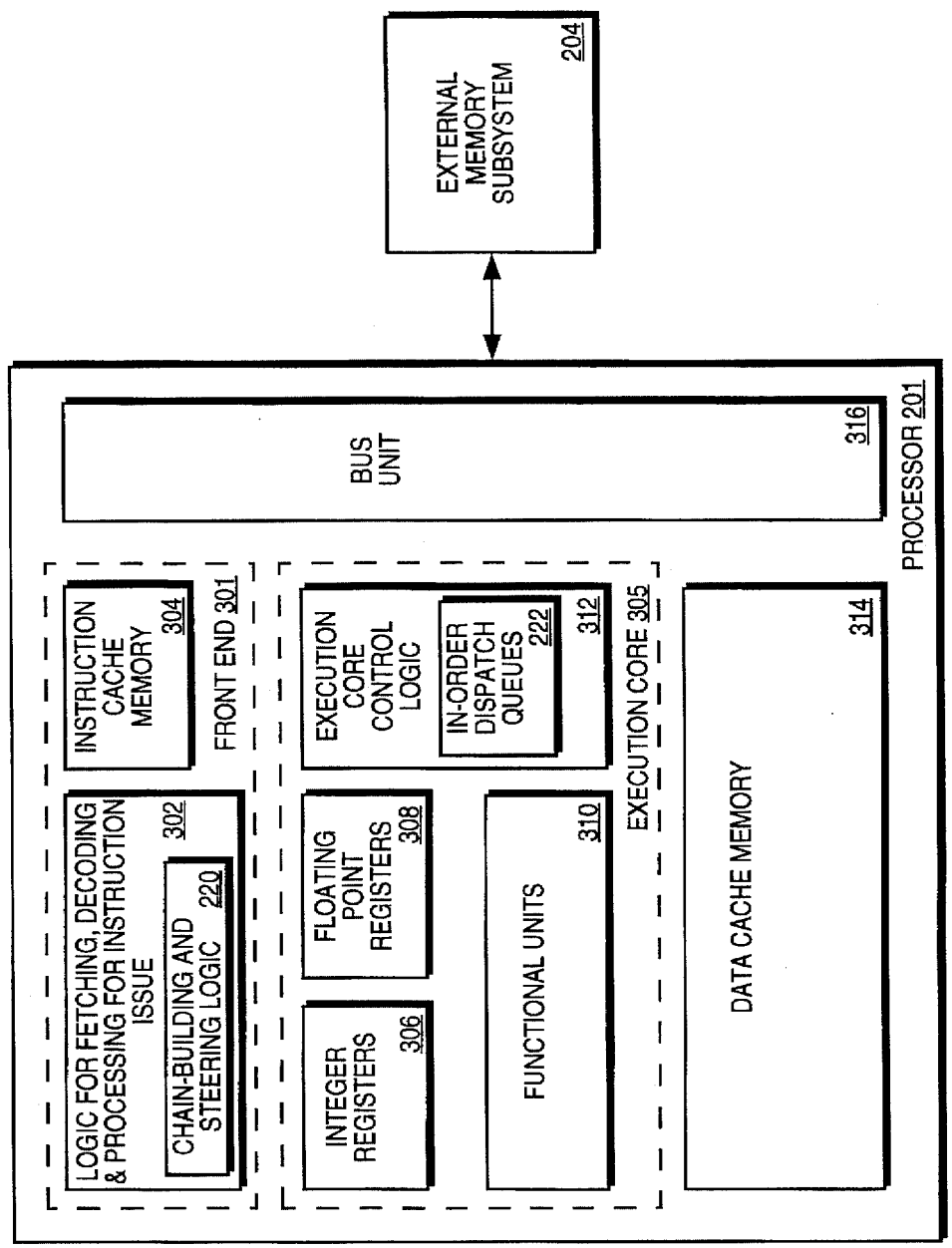
FIG. 3 is a block diagram of the arrangement of the processor and the memory subsystem of one embodiment of the invention.

FIG. 3 illustrates the processor and memory subsystem arrangement of one embodiment of the invention. As shown in FIG. 2, the processor 201 is coupled to the external memory subsystem 204. In one embodiment of the invention, the processor 201 includes an instruction execution front-end 301 and an instruction execution core 305 for executing software instructions, a data cache memory 314 for storing frequently and/or recently used data, and a bus unit 316 for communicating with external devices.

The front-end 301 includes an integrated instruction cache memory 304 for storing instructions as well as logic 302 for fetching, decoding and processing instructions for instruction issue. Instructions are fetched either from the instruction cache memory 304 or from the external memory subsystem 204, decoded into micro-operations in one embodiment, processed for instruction issue and then issued to the execution core 305 by the logic 302. Logic 302 includes chain-building and steering logic 220 in one embodiment. In alternate embodiments, chain-building and steering logic 220 is part of the execution core 305.

The execution core 305 includes integer registers 306 and floating point registers 308, for storing integer and floating point data respectively, for use by functional units 310. Execution core control logic 312 controls the timing and flow of instruction execution in the processor 201, and, in one embodiment, includes in-order dispatch queues 222 for dispatching instructions received from the front end 301, in order, to the functional units 310 for execution. The functional units 310 include execution units for executing instructions received from the instruction execution front-end 301 via the in-order dispatch queues 222. Results of instruction execution in the instruction execution core 305 are then written back to the data cache memory 314. The instruction execution front-end 301 and the instruction execution core 305 of the invention are described in more detail below with reference to FIGS. 4 and 5.

In one embodiment of the invention, the memory subsystem 204 is a "non-blocking" memory subsystem. A non-blocking memory subsystem provides for out-of-order write back of the results of load instructions. Out-of-order write back of instructions enables out-of-order instruction execution in parallel execution units, without causing instruction execution to stall while waiting for a previous instruction in the program flow to be written back to the register file and cache memory 314.

Figure 4:
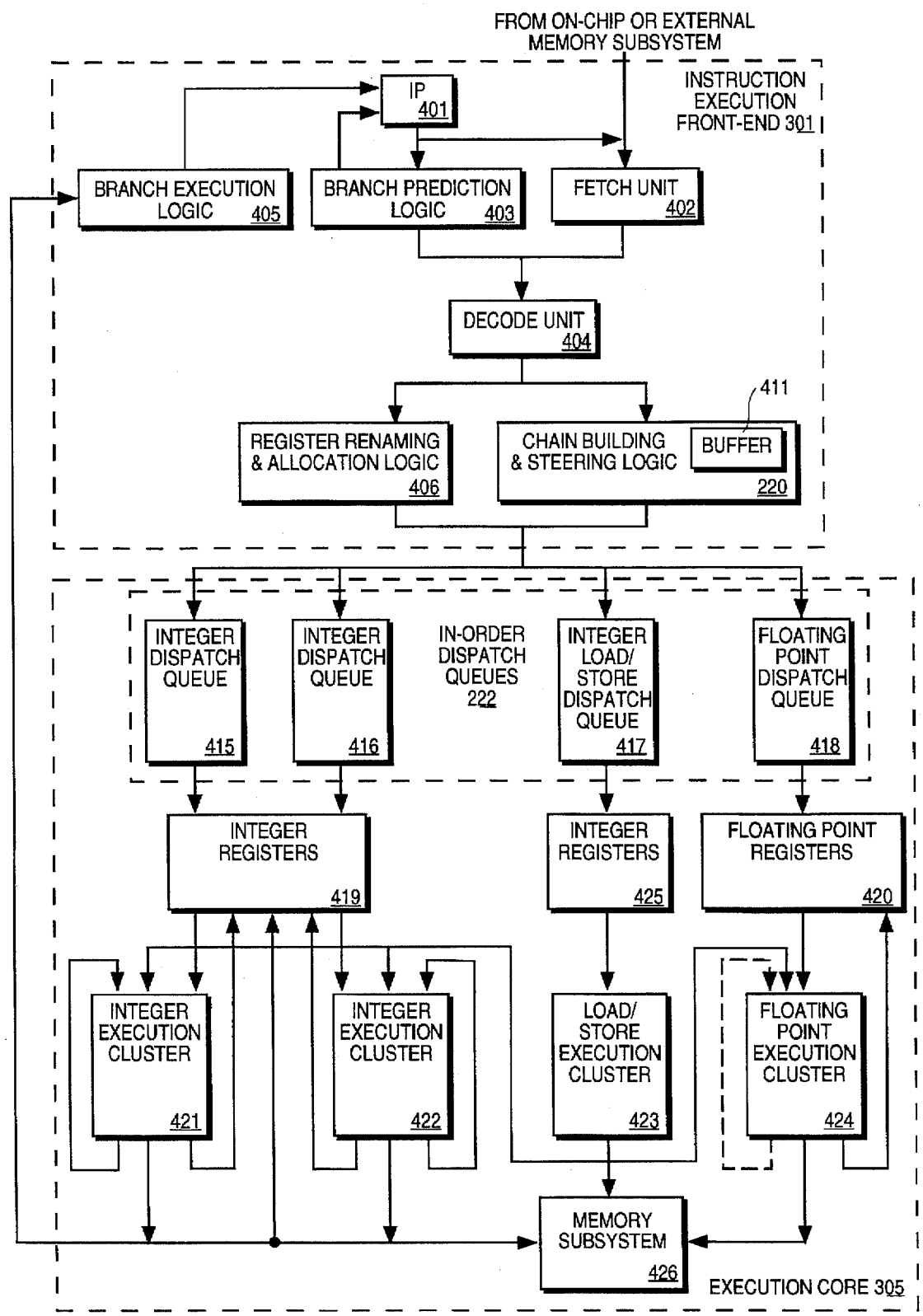
FIG. 4 is a block diagram of the microprocessor instruction execution front-end and execution core of one embodiment of the invention.

Referring now to FIG. 4, the instruction execution front-end 301, and the instruction execution core 305 are shown in more detail. The front-end 301 includes a fetch unit 402 for fetching instructions from memory (usually from the instruction cache 302 in FIG. 3). In one embodiment, an instruction pointer (IP) 401 indicates the location in the software program of the instruction that is currently being fetched. Branch prediction logic 403 uses the IP 401 to perform any required branch prediction in parallel with instruction fetching, and branch execution logic 405 controls execution of branch operations when they are encountered in the program flow. In one embodiment, the instructions are then decoded into micro-operations by a decode unit 404. Instruction fetch, branch prediction and decode are instruction execution operations well-known to those of ordinary skill in the art.

Micro-operations are simplified versions of software instructions that are more easily operated on by the execution core 305. In many architectures, there is a one-to-one mapping of micro-operations to instructions. In one embodiment, the micro-operations are in the format <OP><SRC1><SRC2><DEST> where "OP" is the type of operation, an ADD for example, "SRC1" is the register or memory location of the first operand, "SRC2" is the location of the second operand, and "DEST" is the location where the result of the operation is to be stored. As described above, SRC1 and SRC2 are referred to as source identifiers or operands and DEST is referred to as the destination identifier.

In one embodiment of the invention, the front-end 301 also includes speculative state management logic, illustrated as register renaming and allocation logic 406. The register renaming and allocation logic 406 allocates register space where required by the software instruction stream, and "renames" registers to temporary working registers eliminating the need to copy the contents of a register to another register at instruction retirement.

As discussed above in reference to FIG. 3, the execution core 305 of one embodiment includes dispatch queues 222 which include several individual dispatch queues 415–417 as illustrated. The dispatch queues 415–417 receive instructions from the front-end 301 and dispatch the instructions to the corresponding execution cluster in the order in which the instructions were received from the front end 301, in one embodiment. In an alternate embodiment, the dispatch queues 415, 416, and 418 are in-order dispatch queues, while the load/store dispatch queue 417 provides for out-of-order dispatch of some load operations. The operation of the dispatch queues including the load/store dispatch queue of one embodiment, is described in more detail below.

In one embodiment of the invention, the dispatch queues 415 and 416 are referred to as integer dispatch queues, as they dispatch instructions to the integer execution clusters 421 and 422, respectively. Note that although the integer dispatch queues 415 and 416 share integer registers 419, the integer dispatch queue 415 dispatches instructions to the integer execution cluster 421 and the integer dispatch queue 416 dispatches instructions to the integer execution cluster 422. Similarly, the floating point dispatch queue 418 coupled to the floating point registers 420 dispatches floating point instructions to the floating point execution cluster 424. In one embodiment, one of the dispatch queues 422, such as integer dispatch queue 415, may be a dispatch queue dedicated to branch instructions and coupled to an execution cluster for resolving the branch instructions as discussed in more detail below.

Load and store operations are issued to a separate unified load/store dispatch queue 417 which dispatches the load and store instructions to the load/store execution cluster 423. The load/store dispatch queue 417 is an integer load/store dispatch queue in one embodiment. The execution core 305 may also include a separate floating point load/store micropipeline including a floating point load/store dispatch queue and execution cluster.

The output of the load/store execution cluster 423 is routed to all other execution clusters such that the results of load operations are available to other instructions as needed. As discussed above, in one embodiment, all of the dispatch queues 415–418 in this example, dispatch instructions to the associated execution clusters 421–424 in the order the instructions are received. In another embodiment, all dispatch queues except the load/store dispatch queue 417 dispatch instructions to the execution clusters in-order.

The load/store dispatch queue 417 of one embodiment, provides for out-of-order dispatch of some load and store instructions to reduce stalls which may be caused by a load instruction which cannot be dispatched. In this case, if a load instruction at the top of the dispatch queue 417 cannot be dispatched, the load instruction is marked as pending. A load instruction will not be dispatched, for example, if the load instruction needs to load data whose address is specified in a register location which is still waiting for data from a previously dispatched, but un-executed instruction. The load/store dispatch queue 417 then looks to the next instruction in the load/store dispatch queue 417. If the next instruction is a load which can be dispatched, the load/store dispatch queue 417, dispatches the subsequent load instruction while the first load instruction is still pending.

If the first load is still pending when the load/store dispatch queue 417 is read to dispatch another instruction, the load/store dispatch queue 417 will look at the next instruction. As above, if it is a load instruction which can be dispatched, the load/store dispatch queue 417 will do so. This process can continue for all load instructions following the pending load instruction in order in the dispatch queue, until a store instruction is encountered. Further, if the first load instruction cannot be dispatched, and the following instruction is also a load instruction which cannot be dispatched, the load/store dispatch queue 417 will look at subsequent instructions, in order, for a load instruction which can be dispatched, until a store instruction is encountered. In either case, once a store instruction is encountered as the load/store dispatch queue 417 attempts to dispatch an instruction, the load/store dispatch queue 417 stops dispatching instructions, until all instructions before the store instruction in the load/store dispatch queue, and the store instruction itself, have been dispatched. In this manner, data required for loads or other instructions preceding a store in program order, is not erroneously overwritten.

Thus, in one embodiment, the out-of-order dispatch capabilities of the load/store dispatch queue 417, provide for efficient dispatch of load instructions to keep the registers, such as integer registers 419, fed with data. Although four particular types of dispatch queues 415–418 are shown in FIG. 4, the invention may include more or fewer dispatch queues including different types of dispatch queues, as well as a different number of execution clusters. Also, the dispatch queues 415–418 of the invention may be dedicated to execution clusters performing functions other than those illustrated in FIG. 4.

Still referring to FIG. 4, the instruction execution front-end 301 also includes chain-building and steering logic 220. The chain-building and steering logic 220 receives instructions from the decode unit 404. The chain-building and steering logic 220 identifies dependent instruction chains, and "steers" them to the same dispatch queue. For example, chain-building and steering logic 220 identifies a consumer instruction which requires an operand from a previously issued producer instruction. The chain-building and steering logic 220 "steers" or issues the consumer instruction to the same dispatch queue that the producer instruction producing the required operand was issued to. In one embodiment, the chain-building and steering logic 220 operates in this manner unless the instruction being processed is a load/store instruction. In this embodiment, all load/store instructions are issued to the unified load/store dispatch queue 417, or a similar floating point queue, as discussed above.

In an alternate embodiment, branch instructions are also steered to a separate branch dispatch queue. For example, one of the integer dispatch queues such as dispatch queue 415 may function as a branch dispatch queue. The chain-building and steering logic 220 steers all branch instructions to the same dispatch queue to be resolved, in this embodiment. The results of resolving the branch instruction in the associated execution cluster 421 are then fed back to the branch execution logic 405 to ensure that the correct instruction stream is being processed in the processor pipeline.

Further, in one embodiment, each instruction is issued to only one of the dispatch queues 222. In another embodiment, particular instructions, such as LOAD instructions and branch instructions, are issued to more than one of the dispatch queues 222. A LOAD instruction may be issued both to the dedicated load/store dispatch queue 417, and a separate integer dispatch queue for calculating an address within the LOAD instruction which includes an ADD, for example. Similarly, a branch instruction may be issued to a dispatch queue dedicated to branch resolution as discussed above, and also to a separate dispatch queue. In this manner, the branch instruction is resolved in one micropipeline, and the resolution information is fed to the branch execution logic 405, which in turn, affects the operation of the instruction execution front-end 301 in fetching and executing instructions down the correct path of the branch. Instructions fetched from the path of the branch instruction indicated by the branch prediction logic 403 are issued to the other dispatch queue such that speculative processing proceeds in parallel. Other types of instructions may also be issued to multiple dispatch queues for processing in multiple execution clusters such that the results of executing the instructions are available in parallel in more than one place.

In one embodiment of the invention, the chain-building and steering logic 220 includes a buffer 411 for storing information about instructions as they are issued to the dispatch queues 415–418. Specifically, the chain-building and steering logic 220 stores the destination identifier of the instruction, as well as information indicating which dispatch queue the particular instruction is being issued to. The chain-building and steering logic 220 then compares source identifiers of subsequent instructions to the destination identifiers stored in the buffer 411. If a source identifier of a first instruction matches a destination identifier of a previously issued instruction, then that first instruction is a consumer instruction which depends on the previously issued instruction for an operand. In this case, the chain-building and steering logic 220 issues the identified consumer instruction to the same dispatch queue as its producer instruction, (i.e. the previously issued instruction with the destination identifier matching a source identifier of the consumer instruction).

As mentioned previously, many instructions include two source identifiers. In one embodiment, the chain-building and steering logic 220 looks at only one source identifier, the first source identifier in one embodiment, when comparing source and destination identifiers to determine the appropriate dispatch queue to issue an instruction to. In this manner, the process of issuing instructions to the dispatch queues 415–418 is streamlined to be more efficient, while still providing for improved cycle time based on the organization of the execution clusters 421–424 discussed below. In the event that a consumer instruction is steered to a different dispatch queue than one of its producer instructions, the consumer instruction will complete execution as soon as the result of executing the producer instruction is available in the register file.

If the chain-building and steering logic 220 does not identify a data-dependency between the instruction being issued, and a previously issued instruction in the buffer 411, the instruction being issued is directed to a dispatch queue that is available, and that is coupled to an execution cluster which can perform the operation specified by the instruction. This same approach is used in the case of an instruction for which the only identified data-dependency is resolved by executing a load and/or store operation. Since all load and store operations are issued to the unified load/store dispatch queue 417, instructions which depend only on a load or store instruction for one or more operands, are steered to an available dispatch queue that is coupled to an execution cluster capable of executing the instruction. The output of the load/store execution cluster 423 is routed to all other execution clusters 421–422, and 424, such that the required operands are readily available. In this manner, the chain-building and steering logic 220 helps to efficiently utilize microprocessor resources.

In one embodiment of the invention, the buffer 411 is a small buffer storing data for few instructions, and is thus, inexpensive to implement in terms of silicon space. Also, in the embodiment of the invention illustrated in FIG. 4, which includes four dispatch queues 415–418, the buffer 411 requires only two bits of data to uniquely identify the dispatch queue that a particular instruction has been issued to. Further, comparisons of one or more source identifiers of an instruction to be issued, to destination identifiers of previously issued instructions, can be performed quickly due to the small number of comparisons that need to be performed. In this manner, chain-building and steering functions can operate in parallel with other instruction execution operations.

Still referring to FIG. 4, execution clusters 421–424 are coupled to the dispatch queues 415–417 respectively. The dispatch queues 415–417, except for the load/store dispatch queue 417 of one embodiment, dispatch instructions to the attached execution clusters 421–424 in the order the instructions are received from the chain-building and steering hardware 220, as soon as their operands available. In one embodiment, each of the dispatch queues 415–417 dispatches one instruction per clock cycle for each of the execution units (described with reference to FIG. 5 below) in the execution cluster coupled to the particular dispatch queue.

In alternate embodiments, a different number of instructions may be dispatched each clock cycle to ensure efficient utilization of the execution clusters 421–424. Each dispatch queue and its associated execution cluster (dispatch queue 415 and execution cluster 421, for example) form an independent, decoupled "micro-pipeline". Each micro-pipeline executes instructions independent of the other micro-pipelines. Thus, the invention exploits the instruction-level parallelism of today's software applications by enabling concurrent and efficient execution of several independent chains of dependent instructions.

Figure 5:
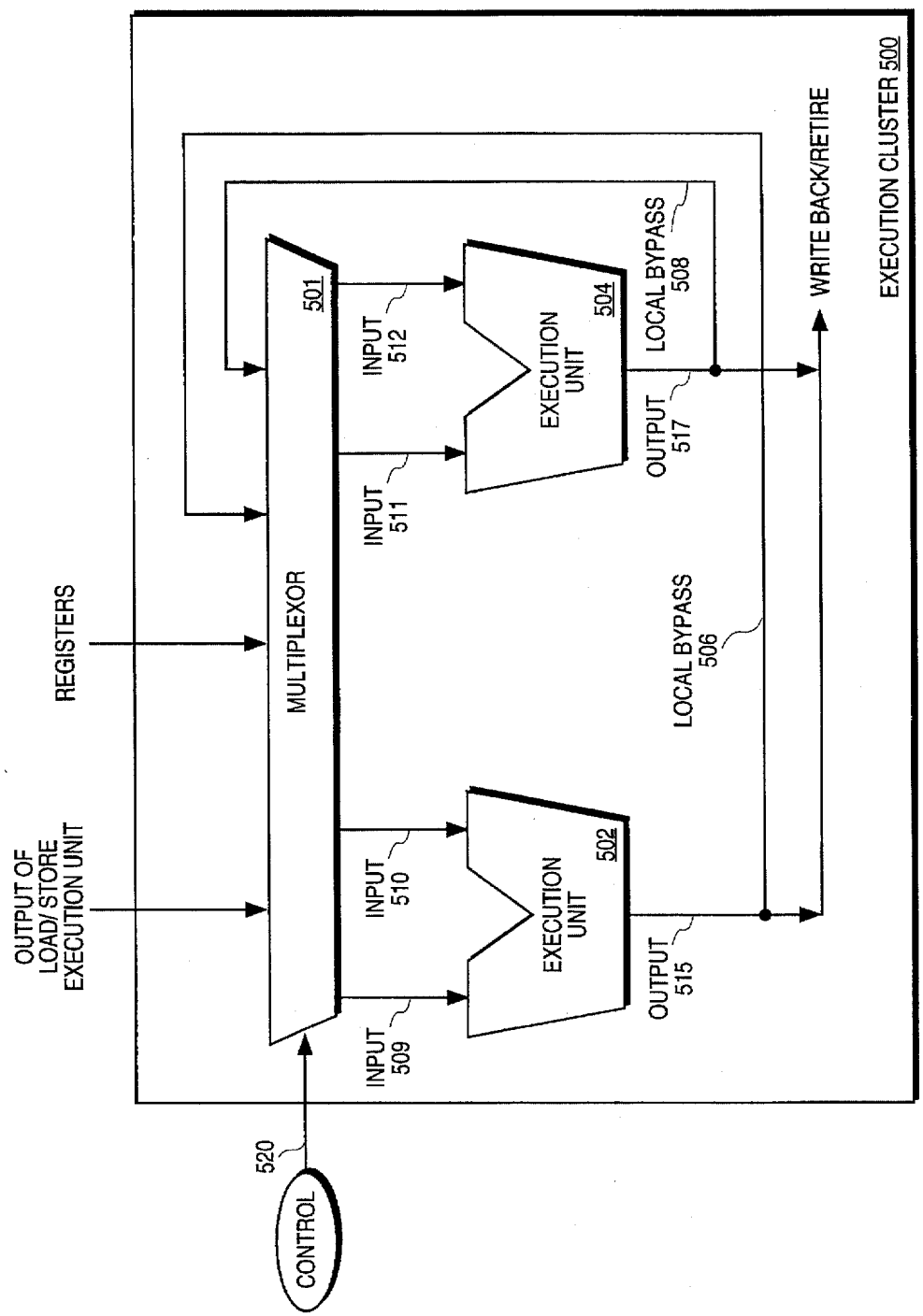
FIG. 5 illustrates an execution cluster of one embodiment of the invention.

Referring now to FIG. 5, an execution cluster 500 is shown in more detail. The execution cluster 500 includes execution units 502 and 504. The execution units 502 and 504 may perform any of a variety of operations. In one embodiment of the invention, the execution units 502 and 504 are both integer instruction execution units. The execution units 502 and 504 are grouped together in the execution cluster 500, such that the outputs 515 and 517 of each execution unit, are readily available to the inputs 509–512 of both of the execution units 502 and 504. Clustering the execution hardware as shown and described above, enables local bypasses to be effectively and efficiently used, such that results of instruction execution are readily available as operands to subsequently executed instructions. Local bypasses 506 and 508 are routed from the outputs 515 and 517 of the execution units 502 and 504 to a multiplexor 501, such that the results of instructions executed in the execution units 502 or 504 are readily available to the inputs 509–512 of either execution unit in the cluster if required. Thus, if a producer instruction is executed in the execution unit 502, and a subsequent consumer instruction is executed in the execution unit 504, the result of the first producer instruction will be available at the multiplexor 501 as an operand for the subsequent consumer instruction.

Along with the local bypasses 506 and 508 routing the output of each execution unit 502 and 504 in the execution cluster 500, to the inputs of the execution cluster 500, in one embodiment, the execution cluster 500 also receives data from the register file and the load/store execution cluster 423, as shown in FIG. 5. Required inputs to the execution units 502 and 504 (i.e. operands for the instruction being executed) are selected by the multiplexor control 520.

As an instruction is dispatched from the dispatch queue 415 for the embodiment illustrated in FIG. 5, to the execution cluster 421, the location of the each of the operands for the instruction is identified. Execution core control logic 312 (FIG. 3) looks in the register file for the operand indicated by the instruction. In one embodiment, a register scoreboard scheme is implemented to indicate whether the required data is in the register or not. A bit in the register, one of the integer registers 419 in this example, is set if the data is not available. In parallel, the execution core control logic 312 snoops the local bypasses 506 and 508, and the load/store execution cluster return to determine whether the data is in either of these locations. Once the location of the required operand or operands is identified, the appropriate control signal is asserted to select the desired input to the multiplexor 501. The implementation of register scoreboards, and the operation of multiplexors to select desired signals is well-known to those of ordinary skill in the art.

Figure 1:
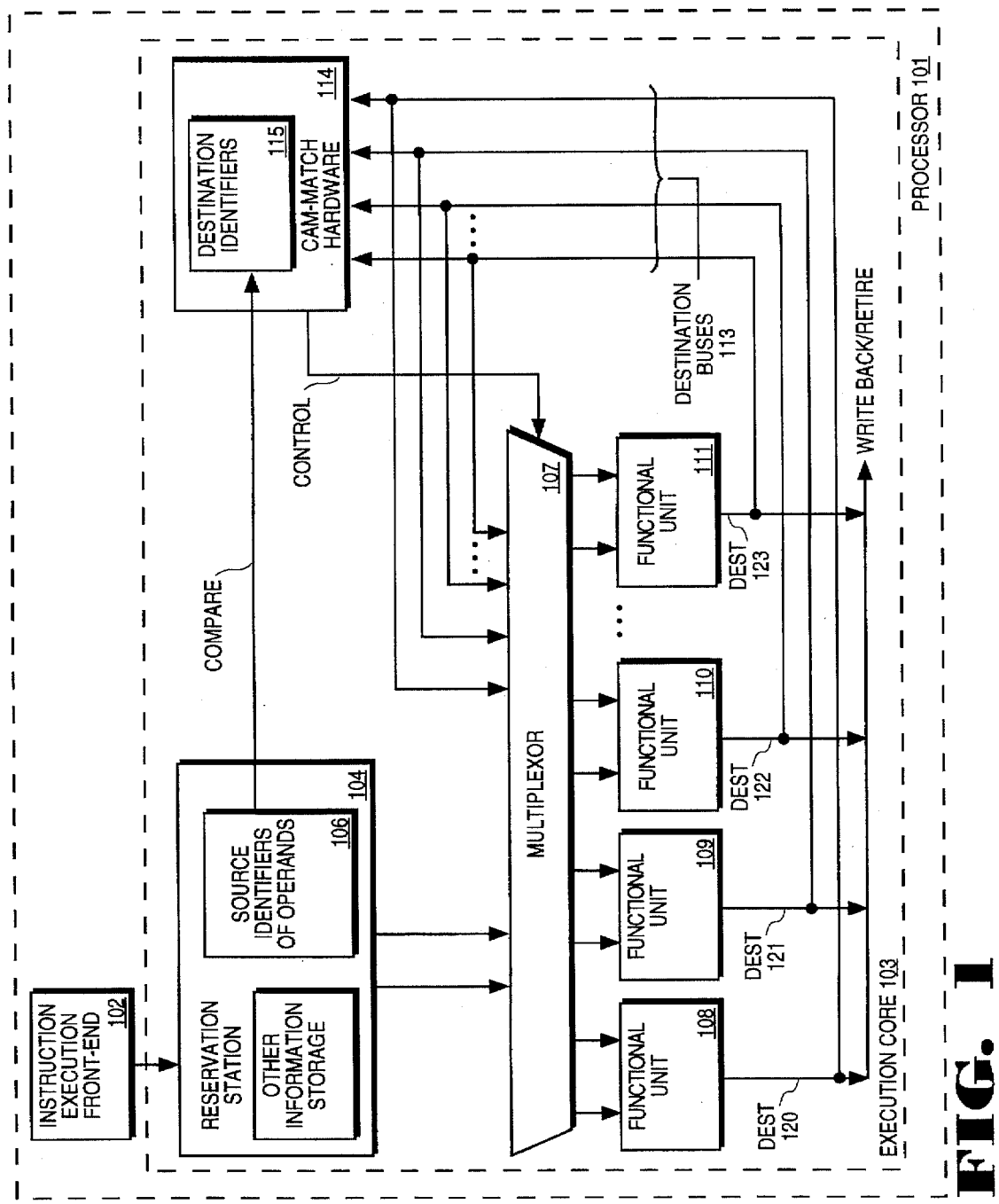
FIG. 1 is a block diagram of the arrangement of a microprocessor instruction execution front-end and execution core.

Use of local bypasses 506 and 508, along with routing from the load/store execution cluster 423, in comparison with exclusive use of global bypasses as described with reference to FIG. 1, provides the advantage of reducing instruction execution latency, and streamlining interconnect to enable the processor to scale better with improvements in process technology. Local bypasses 506 and 508 also help to reduce cycle time by exploiting locality of computation. In other words, output data from previously executed instructions is more readily available to execution unit inputs for execution of consumer instructions, which the microarchitecture inserts into the same execution cluster in most cases.

Although the execution cluster 500 of FIG. 5 includes two execution units, execution clusters may include different numbers of execution units. Referring back to FIG. 4, in one embodiment of the invention, one execution cluster 421 may include three execution units, while the other execution clusters 422–424 include two execution units. Further, local bypasses, such as local bypasses 506 and 508, may be used in conjunction with global bypasses as desired. Providing additional bypasses increases the number of comparisons that are required between source and destination identifiers, thereby potentially increasing cycle times, but can also provide additional options when dispatching instructions from the dispatch queues 415–418. Thus, the level of bypassing in the microarchitecture may be varied to tune for specific requirements of the microarchitecture such as cycle time. Additionally, the number of dispatch queues, and thus, micro-pipelines can be varied, as can the number of instructions issued from the dispatch queues each clock cycle. Thus, the microarchitecture of the invention provides flexibility to meet a range of performance requirements.

The processor microarchitecture of the invention provides other advantages as well. The chain-building and steering logic 220 of the invention reduces the number of stalls in the instruction issue phase, as data-dependencies do not need to be resolved prior to issuing instructions to a dispatch queue. Further, the chain-building and steering logic 220, in cooperation with the dispatch queues 222 of the invention, provides for dynamic re-ordering of the instruction schedule generated by the compiler, without the use of expensive CAM-match hardware. In this manner, independent instruction streams can be executed in alternate dispatch queues when load misses occur, or other instructions which could potentially stall a chain of computation are encountered. Also, the invention reduces the number of source-to-destination identifier comparisons required, and thus, does not introduce the same limits on cycle time presented by the CAM-matching requirements of other microprocessors. In this way, the invention provides for efficient instruction execution, and dynamic rescheduling of the static compiler schedule.

The invention complements advanced software tools by providing improved partitioning between compilers with instruction scheduling and the microarchitecture of the microprocessor in terms of management of instruction execution flow and efficient utilization of microprocessor resources. The compiler schedules instructions with fixed latencies, and relies on the microprocessor hardware to tune for cases having latencies which are non-deterministic at compile time, such as load misses, and branch resolution.

The Method of One Embodiment of the Invention

Figure 6A:
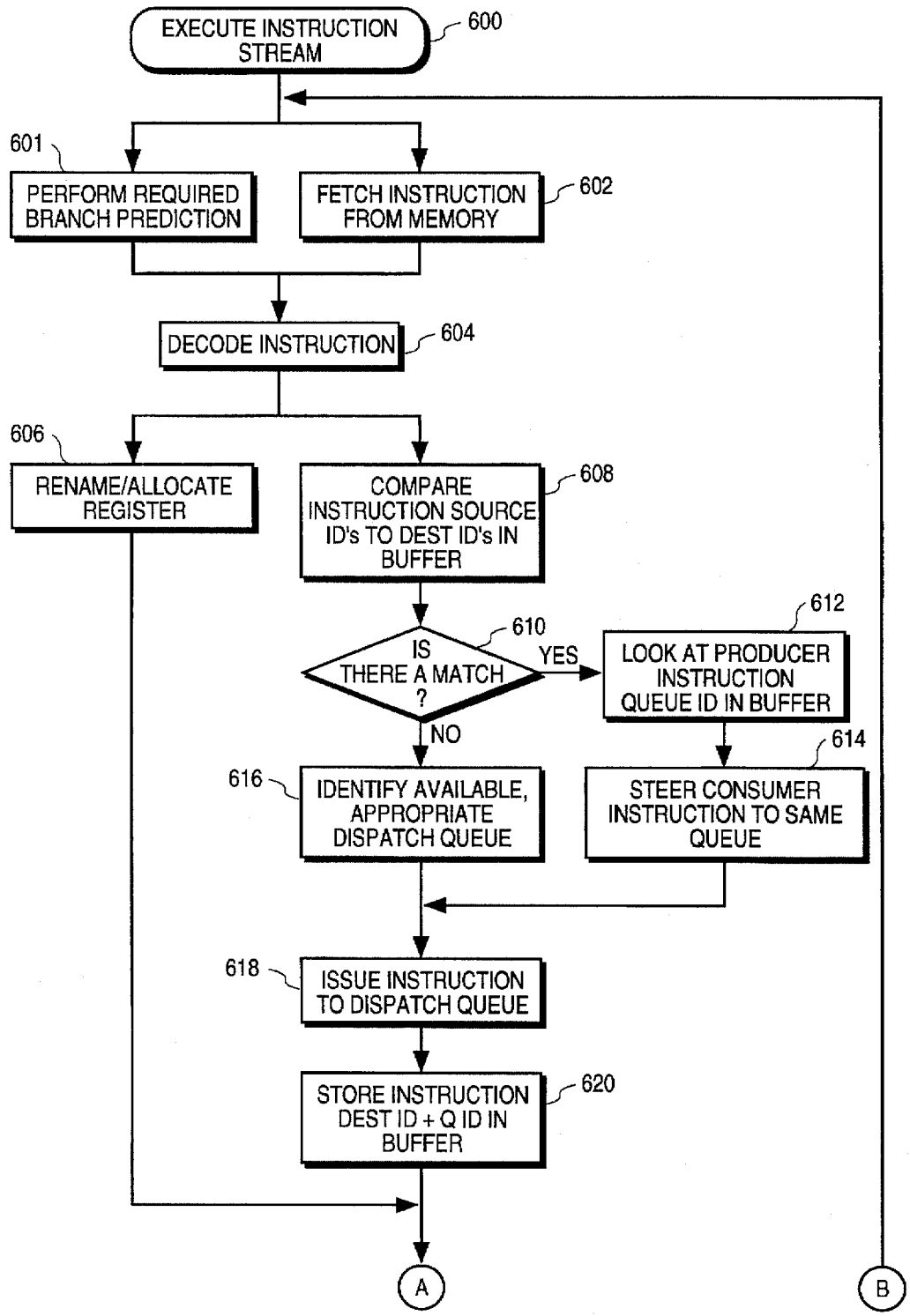
FIGS. 6a and 6b illustrate one embodiment of the method of the invention.
Figure 6B:
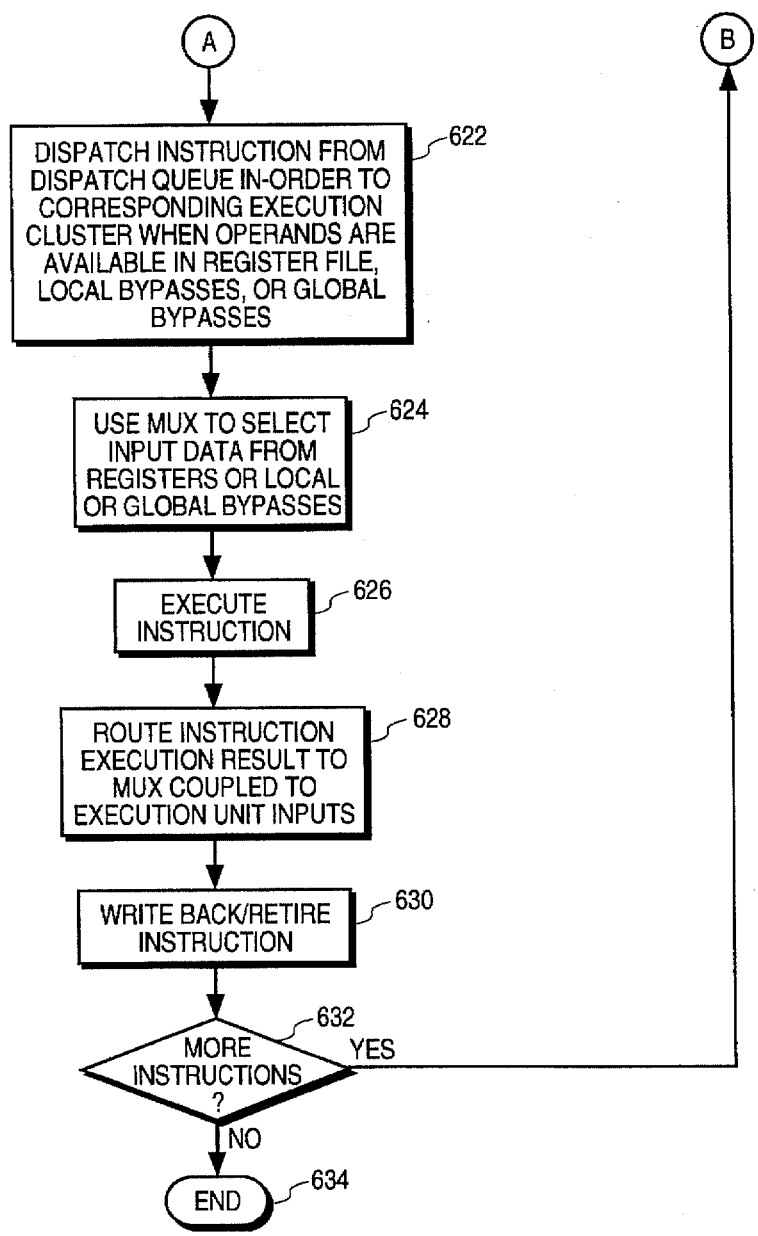

Referring now to FIGS. 6a and 6b together, the method of one embodiment of the invention is illustrated in a flow chart diagram. The instruction stream execution method of the invention starts at processing block 600 and proceeds to processing blocks 601 and 602 in parallel. In processing block 602, instructions are fetched from memory (either the instruction cache memory or from the external memory subsystem), and, concurrently, in processing block 601, any required branch prediction is performed. Moving to processing block 604, the instruction is decoded into a micro-operation, in some embodiments.

In processing block 606, registers are renamed and allocated as required. In parallel, in processing block 608, source identifiers of the instruction are compared to destination identifiers stored in the above-described chain-building and steering logic buffer. At decision block 610, if one of the instruction source identifiers or operands matches a destination identifier of a previously issued instruction as indicated by data stored in the chain-building and steering logic buffer, the instruction stream execution method of the invention moves to processing block 612. In processing block 612, the chain-building and steering logic of the invention looks at the information in the buffer to determine which dispatch queue the identified producer instruction was issued to and, in processing block 614, the consumer instruction is steered to the same dispatch queue as that producer instruction. In processing block 618, the instruction is issued to the identified dispatch queue.

Going back to decision block 610, if there is not a match between the source identifiers of the present instruction and the destination identifiers stored in the chain-building and steering logic buffer, or, if the instruction is dependent only on a load or store instruction for missing data, the appropriate dispatch queue to steer the independent instruction to is identified in processing block 616. The particular dispatch queue identified will depend on the type of instruction being processed, as well as which dispatch queue or queues are available. In processing block 618 as discussed, the instruction is issued to the identified dispatch queue by the chain-building and steering logic, and in processing block 620, the destination identifier of the instruction being issued, as well as information indicating which dispatch queue the instruction is being issued to, is stored in the buffer for subsequent chain-building and steering operations. It should be noted that, in one embodiment, all loads and stores are steered to a unified load/store dispatch queue.

The instruction is then dispatched from the dispatch queue in the order received to the corresponding cluster of execution units in processing block 622. In an alternate embodiment, load and store instructions are dispatched from the load/store dispatch queue according to the algorithm described above with reference to FIG. 4.

In processing block 624, using a multiplexor in one embodiment, input data is selected from the registers, or the local or global bypasses, as indicated by the instruction source identifiers. If the instruction is a consumer instruction which relies on a producer instruction that has just been executed, the required data available on the local bypasses will be selected. Data from registers and global bypasses will be selected in other cases. In processing block 626, the instruction is executed, and in processing block 628, the result of the instruction execution is routed to the multiplexor for use by subsequent instructions where required.

In processing block 630, instruction execution results are written back to the register file or data cache where required, and the instruction is retired. In decision block 632, if there are more instructions to execute, the instruction stream execution process of the invention restarts at parallel processing blocks 601 and 602. If the last instruction has been executed, the process ends at block 634. Thus, the method of the invention provides for efficient dynamic scheduling and execution of instructions.

It should be noted that, in a pipelined processor architecture, as soon as an instruction completes one step of the method, another instruction will move to that step, such that, ideally, the pipeline is always full of instructions at various stages of execution.

Whereas many alterations and modifications of the invention will no doubt be appreciated by one of ordinary skill in the art after having read the foregoing description, it is understood that the particular embodiments shown and described by way of illustration are in no way intended to be considered limiting. Therefore, references to details of the individual embodiments are not intended to limit the scope of the claims which in themselves recite only those features regarded as essential to the invention.

We claim:

1. A processor for processing instructions in a program flow, wherein the instructions in the program flow each have a source identifier and a destination identifier, the program flow including a consumer instruction and a producer instruction, the consumer instruction relying on the producer instruction for an operand, the processor comprising:

- a plurality of dispatch queues for dispatching instructions to be executed;
- a plurality of execution clusters, at least one execution cluster coupled to each of the dispatch queues for executing instructions received from the dispatch queue; and
- logic receiving the instructions in the program flow and issuing the consumer instruction to a same dispatch queue as the producer instruction, the dispatch queue dispatching the instructions to the associated execution cluster, such that a result of executing the producer operation is available as the operand for the consumer operation and wherein the logic includes a buffer storing a destination identifier of a first instruction issued by the logic to one of the plurality of dispatch queues and also storing queue information indicating which of the plurality of dispatch queues the first instruction is issued to.

2. The processor of claim 1 wherein the dispatch queues include a load/store dispatch queue for dispatching load/store instructions and the execution clusters include a load/store execution cluster coupled to the load/store dispatch queue for executing load/store instructions.

3. The processor of claim 2 wherein the load/store dispatch queue dispatches a second load instruction immediately following a first load instruction in the load/store dispatch queue if the load/store dispatch queue is unable to dispatch the first load/store instruction.

4. The processor of claim 3 wherein a third load operation immediately following the second load operation in the load store queue is dispatched following the dispatch of the second load operation independent of whether the first load operation has been dispatched.

5. The processor of claim 3 wherein the load/store dispatch queue dispatches a store instruction when all instructions prior to the store instruction in the load/store dispatch queue have been dispatched.

6. The processor of claim 2 wherein each of the execution clusters comprises at least one execution unit, each of the execution units having inputs and an output.

7. The processor of claim 6 wherein each of the execution clusters includes local bypasses coupling the output of each execution unit in the cluster to the inputs of all execution units in the cluster, such that output data of each execution unit is selectable as input data to each execution unit for execution of the consumer instruction.

8. The processor of claim 7 wherein the output of the load/store execution cluster is routed to the inputs of all execution units in all of the execution clusters.

9. The processor of claim 1 wherein the logic further compares the source identifier of a second instruction to the destination identifier of the first instruction stored in the buffer.

10. The processor of claim 9 wherein, if the source identifier of the second instruction matches the destination identifier of the first instruction stored in the buffer, the logic issues the second instruction to a same dispatch queue as the first instruction in response to the queue information stored in the buffer.

11. In a computer system, which includes a processor having a plurality of dispatch queues, a method of executing instructions in a program flow comprising the steps of:

- issuing a producer instruction to one of the plurality of dispatch queues;
- storing a destination identifier of the producer instruction in a buffer;
- storing a dispatch queue identifier in the buffer, the dispatch queue identifier indicating which of the plurality of dispatch queues the producer instruction is being issued to; and
- identifying a consumer instruction having an operand matching the destination identifier of the producer instruction; and
- issuing the consumer instruction to a same dispatch queue as the producer instruction, the consumer instruction relying on execution of the producer instruction for the operand.

12. The method of claim 11 further including the steps of:
- dispatching the producer instruction to a cluster of execution units coupled to the dispatch queue;
- executing the producer instruction to produce the operand;
- routing the operand to an input of the execution cluster; and
- executing the consumer instruction using the operand.

13. The method of claim 11 wherein the step of identifying is performed by comparing the operand of the consumer instruction to the destination identifier of the producer instruction, the destination identifier being stored in the buffer.

14. The method of claim 11 further including a step of routing all load instructions and all store instructions to a load/store dispatch queue.

15. The method of claim 14 wherein the load/store dispatch queue dispatches a second load instruction immediately following a first load instruction to a load/store execution cluster if the load store dispatch queue is unable to dispatch the first load instruction.

16. A computer system comprising:
- a memory subsystem storing instructions;
- a processor coupled to the memory subsystem comprising:
    - a fetch unit for fetching instructions in a program flow from the memory subsystem, wherein the instructions in the program flow each have an operand and a destination identifier, the program flow including a consumer instruction and a producer instruction, the consumer instruction relying on execution of the producer instruction for an operand;
    - a plurality of dispatch queues coupled to the fetch
    - a plurality of execution clusters for executing instructions received from the dispatch queues, at least one of the execution clusters being coupled to each of the dispatch queues; and
    - logic means receiving the instructions in the program flow from the fetch unit, and issuing the consumer instruction to a same dispatch queue as the producer instruction, and wherein the logic means includes a buffer storing a destination identifier of the producer instruction issued by the logic means to one of the plurality of dispatch queues, and storing queue information indicating which of the plurality of dispatch queues the producer instruction is issued to.

17. The computer system of claim 16 further including register renaming and allocation logic receiving instructions from the fetch unit wherein the logic means operates on a same instruction in parallel with the register renaming and allocation logic.

18. The computer system of claim 16 wherein each of the execution clusters comprises at least one execution unit, each of the execution units having inputs and an output.

19. The computer system of claim 18 wherein each of the execution clusters includes local bypasses coupling the output of each execution unit in the cluster to the inputs of all execution units in the cluster such that output data of each execution unit is selectable as input data to each execution unit for execution of the consumer instruction.

20. The computer system of claim 19 wherein the logic means further compares the operand of the consumer instruction to the destination identifier of the producer instruction, the destination identifier being stored in the buffer.

21. The computer system of claim 20 wherein if the operand of the consumer instruction matches the destination identifier of the producer instruction, the logic means issues the consumer instruction to a same dispatch queue as the producer instruction in response to the queue information stored in the buffer.

22. The computer of claim 16 further including register and naming an allocation logic and plurality of execution units coupled to the renaming and allocation logic.

* * * * *

UNITED STATES PATENT AND TRADEMARK OFFICE
CERTIFICATE OF CORRECTION

| | | |
|---|---|---|
| PATENT NO. | : | 5,699,537 |
| DATED | : | December 16, 1997 |
| INVENTOR(S) | : | Sharangpani et al. |

It is certified that error appears in the above-identified patent and that said Letters Patent is hereby corrected as shown below:

In column 10 at line 52 delete "duster" and insert --cluster--

Signed and Sealed this

Seventeenth Day of March, 1998

Attest:

BRUCE LEHMAN

*Attesting Officer*  *Commissioner of Patents and Trademarks*